Dec. 9, 1924.

R. J. McCLENNY 1,518,993

BARREL STAVE ASSEMBLING AND FORMING MACHINE

Filed Dec. 3, 1923    5 Sheets-Sheet 1

INVENTOR.
Robert J. McClenny,
BY
Geo. P. Kimmel.
ATTORNEY.

Dec. 9, 1924.

R. J. McCLENNY 1,518,993

BARREL STAVE ASSEMBLING AND FORMING MACHINE

Filed Dec. 3, 1923  5 Sheets-Sheet 2

INVENTOR.
Robert J. McClenny,
BY
Geo. P. Kimmel ATTORNEY.

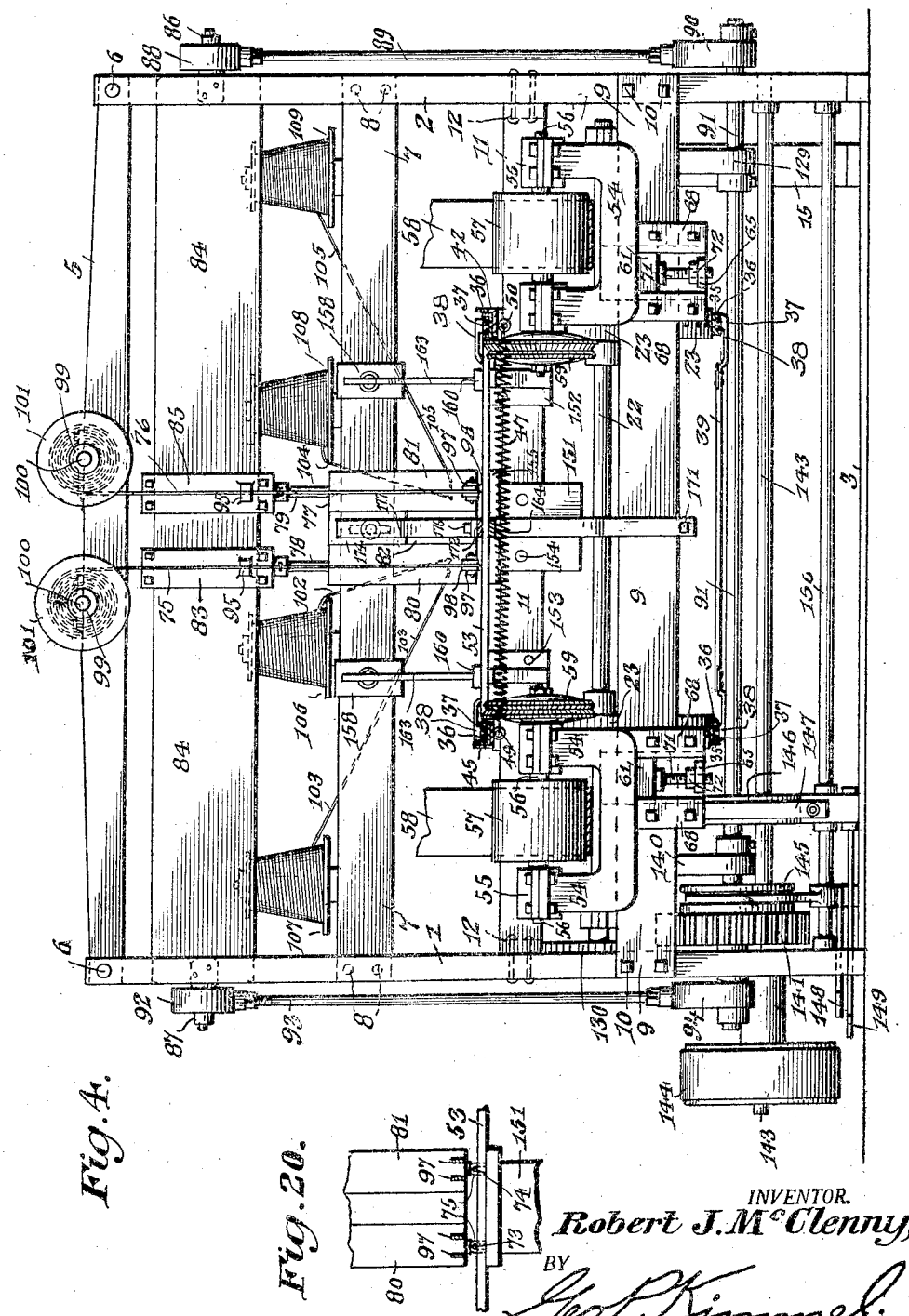

Dec. 9, 1924.　　　　　　　　　　　　　　　　　　1,518,993
R. J. McCLENNY
BARREL STAVE ASSEMBLING AND FORMING MACHINE
Filed Dec. 3, 1923　　　5 Sheets-Sheet 4
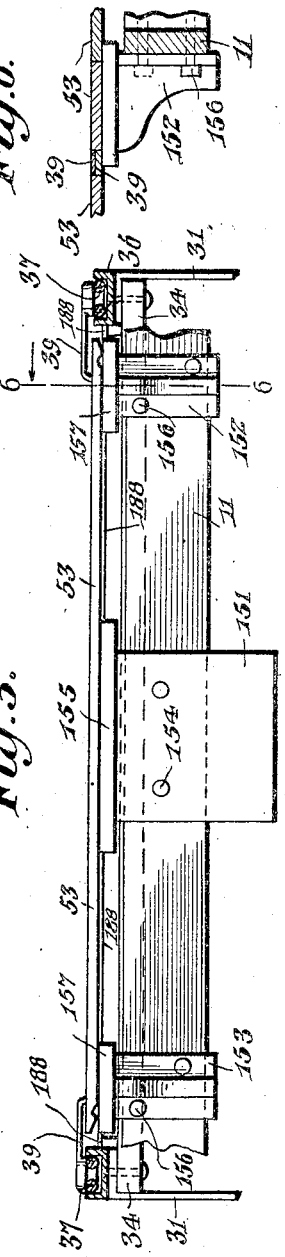
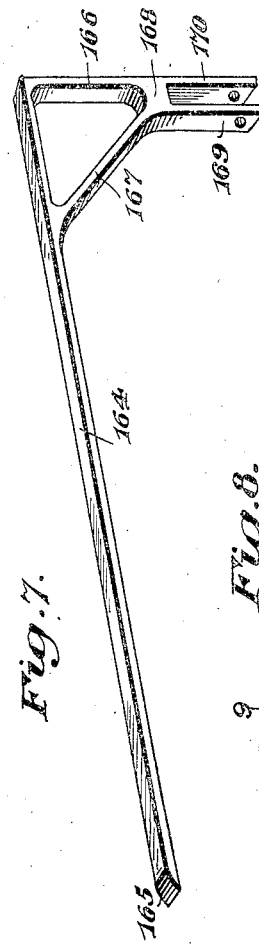
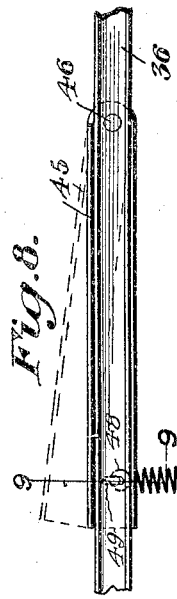
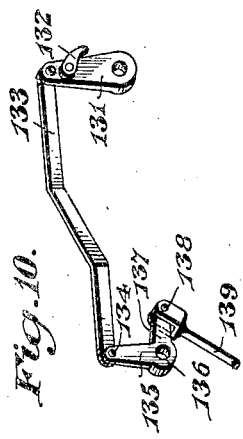
INVENTOR.
Robert J. McClenny,
BY
Geo. F. Kimmel
ATTORNEY.

Dec. 9, 1924.   1,518,993
R. J. McCLENNY
BARREL STAVE ASSEMBLING AND FORMING MACHINE
Filed Dec. 3, 1923   5 Sheets-Sheet 5
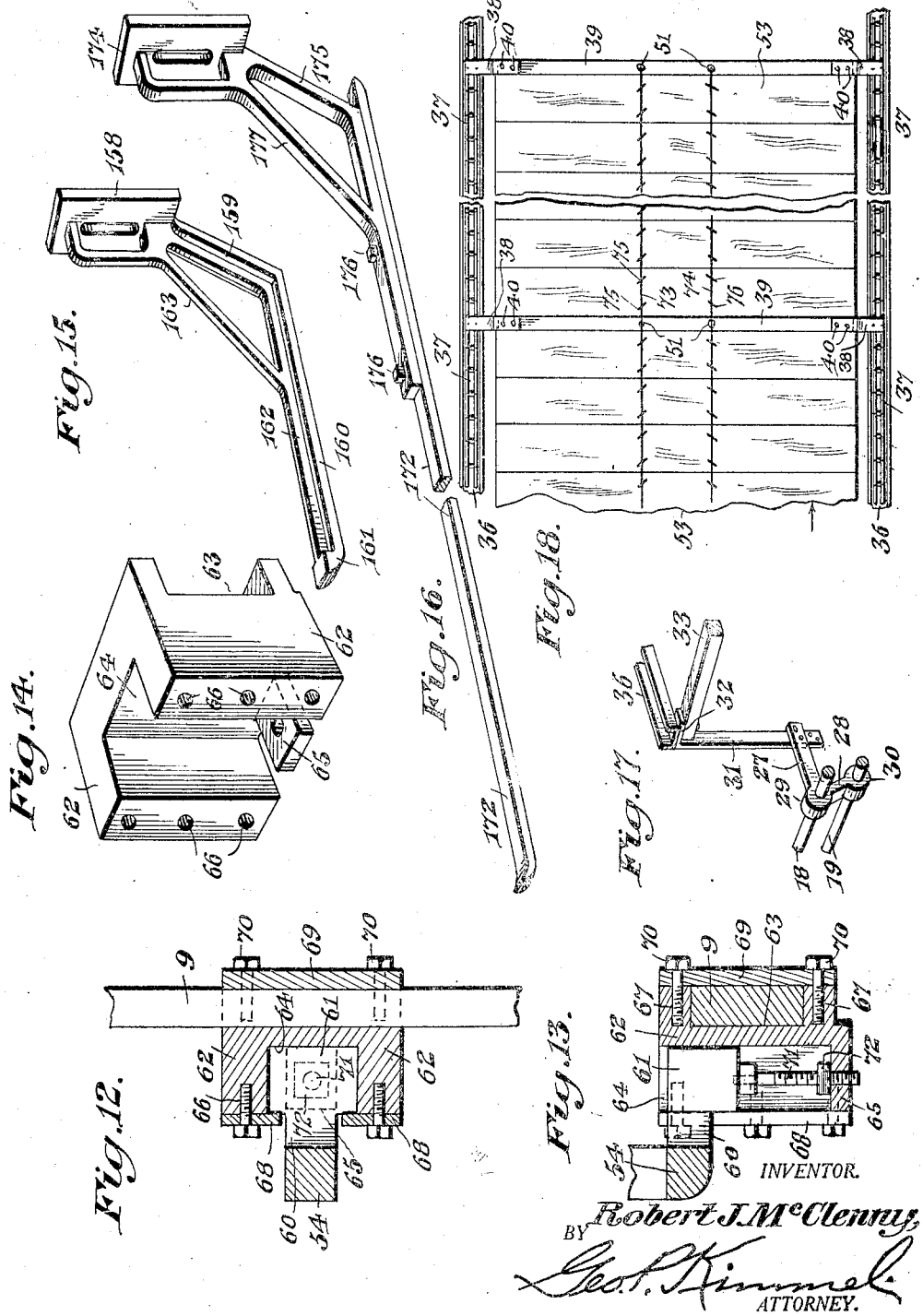

Patented Dec. 9, 1924.

1,518,993

UNITED STATES PATENT OFFICE.

ROBERT J. McCLENNY, OF ST. LOUIS, MISSOURI, ASSIGNOR TO NU-WAY BARREL AND MACHINERY CO., INC., OF ST. LOUIS, MISSOURI.

BARREL-STAVE ASSEMBLING AND FORMING MACHINE.

Application filed December 3, 1923. Serial No. 678,363.

*To all whom it may concern:*

Be it known that I, ROBERT J. MCCLENNY, a citizen of the United States, residing in the city of St. Louis and State of Missouri, have invented certain new and useful Improvements in Barrel-Stave Assembling and Forming Machines, of which the following is a specification.

This invention relates to a barrel stave assembling and forming machine, designed primarily for use in connection with the manufacture of collapsible barrel bodies, but it is to be understood that a machine in accordance with this invention can be employed for any purposes for which it is found applicable, and the invention has for its object to provide, in a manner as hereinafter set forth, a machine of such class including means for assembling, chamfering, bevelling, shortening to the desired length, and connecting together a predetermined number of barrel staves to constitute the body portion of a collapsible barrel, and with the assembled staves connected together through the medium of a pair of connecting wires, each having free terminal portions, and with the said wires stapled to the outer face of the staves in proximity to the transverse center thereof, whereby when the free terminal portions of each wire are connected together or otherwise suitably anchored, reinforcing, stay and connecting members, are provided for the central portion of the collapsible barrel body when the latter is set up in closed position.

A further object of the invention is to provide, in a manner as hereinafter set forth, a machine of such class, including means for chamfering, as well as bevelling the inner faces of the staves, as well as shortening the staves to the desired length, slightly in advance of the securing to the outer face of the staves, transversely thereof, of a pair of connecting wires, and with such means adjustably mounted to provide for its action upon staves of different lengths.

A further object of the invention is to provide, in a manner as hereinafter set forth, a machine of the class referred to, including an endless conveyor provided with equally spaced carriers for the assembling on and carrying by the conveyor of independent sets of staves, each set consisting of a predetermined number for connection together by reinforcing members to form a collapsible barrel body.

Further objects of the invention are to provide, in a manner as hereinafter set forth, a barrel stave assembling and forming machine which is comparatively simple in its construction and arrangement, strong, durable, thoroughly efficient and convenient in its use, readily assembled, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 2 is a side elevation thereof.

Figure 3 is a vertical longitudinal sectional view thereof.

Figure 4 is a section on line 4—4, Figure 3.

Figure 5 is a fragmentary view, in section, illustrating the supporting means for the staves while being stapled.

Figure 6 is a section on line 6—6, Figure 5.

Figure 7 is a perspective view of the lower central combined support and guide for the staves.

Figure 8 is a fragmentary view, in plan, illustrating the confining member for the staves of a set.

Figure 9 is a section on line 9—9, Figure 8.

Figure 10 is a perspective view of the driving lever for the conveyor.

Figure 11 is a similar view of the driving lever for the staple wire feeding mechanism.

Figure 12 is a sectional plan of the adjustable supporting element for the stave cutting, bevelling and chamfering mechanism.

Figure 13 is a vertical sectional view of the adjustable supporting element referred to in Figure 12.

Figure 14 is a perspective view of the adjustable supporting element shown in Figure 12.

Figure 15 is a perspective view of one of the holding-down elements for the staves.

Figure 16 is a view similar to Figure 15, broken away, of the upper central combined guide and holder for the staves.

Figure 17 is a fragmentary view, illustrating the manner of supporting the frame of the conveyor.

Figure 18 is a fragmentary view, broken away, illustrating in plan a pair of sets of staves having the connecting wires secured thereto.

Figure 19 is a sectional elevation of the adjustable means for the upper central combined guide and holder.

Figure 20 is a fragmentary view in front elevation, illustrating conventionally a staple forming and driving mechanism and the position of a pair of staples with respect to a stave.

Figure 1:
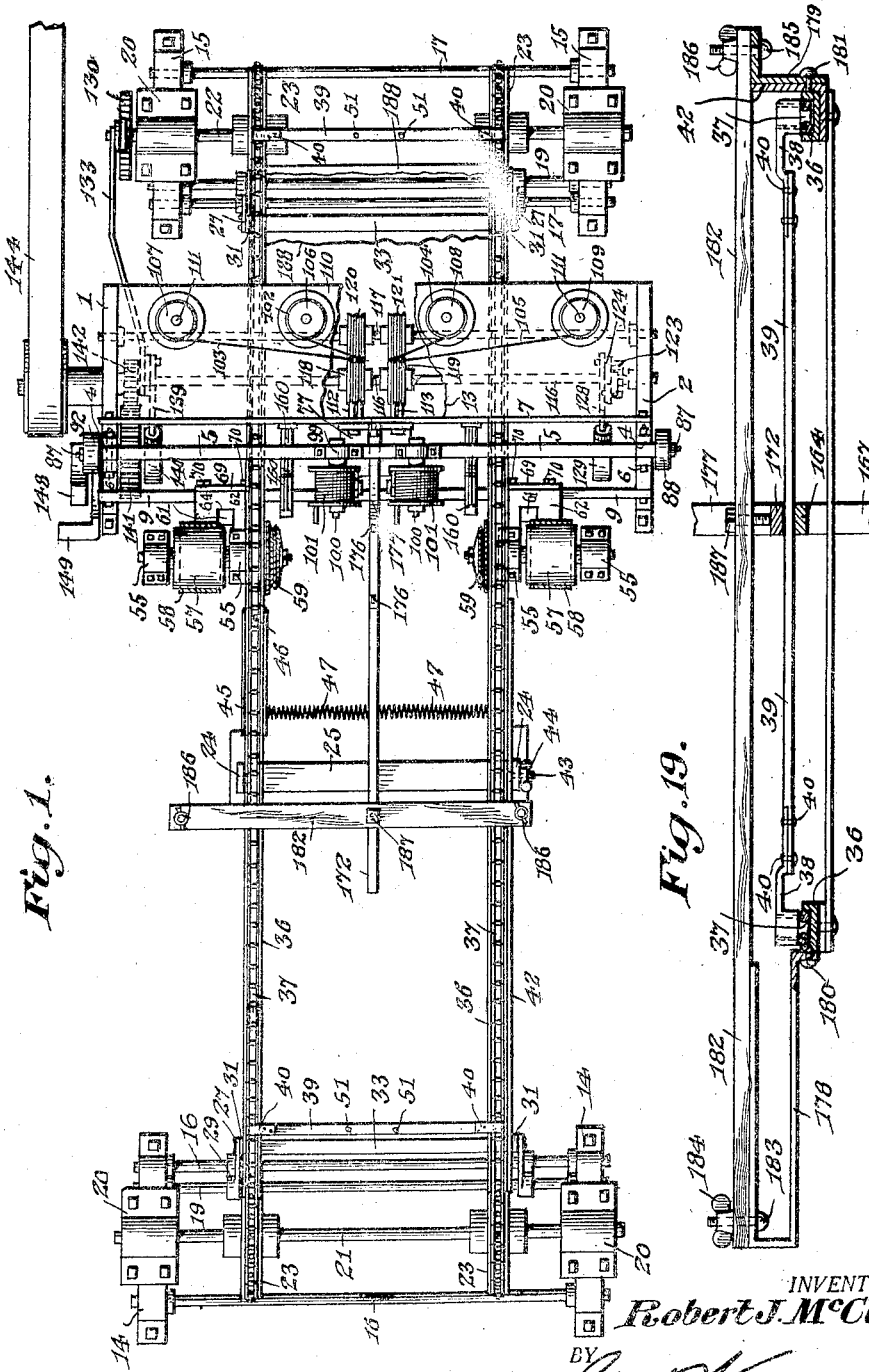
Figure 1 is a top plan view, broken away, of a barrel stave assembling and forming machine, in accordance with this invention.

A barrel stave assembling and forming machine, in accordance with this invention, comprises an endless conveyor mechanism provided with a plurality of spaced carriers and between each pair thereof is adapted to be arranged a set of staves of a predetermined number, or of a number to extend from one carrier to the other and with the number of staves of a set to provide a collapsible barrel body when the staves are connected together by a pair of spaced connecting wires which are secured transversely of the outer face of the staves at the central portion thereof. The conveyor mechanism intermittently shifts the staves of each set to be acted upon not only for connecting thereto the wires, but also to position the staves of each set to be acted upon for the purpose of chamfering and bevelling the end terminal portions of the staves, as well as shortening the length of the staves. The machine further comprises a driving mechanism for intermittently shifting the conveyor mechanism, a pair of combined cutting, bevelling and chamfering mechanisms, an adjustable supporting element for each of the latter, independent operating means for each of the combined cutting, bevelling and chamfering mechanisms, a staple forming and driving mechanism, operating means therefor, staple wire feeding devices, operating means therefor, connecting wire supporting devices, a series of stave supports, one coacting with the staple forming and driving mechanism to clench the staples against the staves, an upper combined stave guide and holder, a lower combined stave guide and support, a pair of stave holding-down elements, a stave confining member, a drive common to the several operating mechanisms, and a supporting frame for the drive and certain of said mechanisms, as hereinafter referred to.

*The supporting frame.*—The frame comprises a pair of triangular shaped standards 1, 2, each provided with a foot piece 3 and each having its upper portion formed centrally with a vertically disposed slot 4. The upper end of the standards 1, 2, are connected together by a head bar 5 and which has each end terminal thereof extended into the upper portion of a slot 4 and fixedly secured to a standard by a hold-fast device 6. The standards 1, 2, are connected together, intermediate their ends, by a rectangular brace member 7 positioned on edge and secured at the rear of the standards by hold-fast devices 8. Below the brace member 7, the standards 1, 2, are further secured together through the medium of a rectangular supporting bar 9, positioned on edge and secured to the front of the standards by hold-fast devices 10.

Arranged between the standards 1, 2, is a supporting bar 11, rectangular in contour and standing on edge. The bar 11 is connected to angle irons 12, which are secured to the inner faces of the standards. The bar 11 is arranged between the bars 7 and 9. Extending rearwardly from the bar 7 is a platform 13.

*Conveyor mechanism.*—This mechanism is arranged forwardly and rearwardly with respect to the supporting frame, and extends through said frame above the bar 11 and below the supporting bar 9. The conveyor mechanism comprises a pair of spaced forward standards 14, and a pair of spaced rear standards 15. The standards 14 have connected to their lower ends a pair of spaced tie bars 16, and the standards 15 have connected to their lower ends a pair of spaced tie bars 17. The standards 14, as well as the standards 15 are further connected together by a pair of tie bars 18, 19, arranged at the inner sides of each pair of standards, approximately centrally thereof and are positioned in superposed relation but spaced from each other. Each of the standards 14 and 15 has its top provided with a bearing 20. Journaled in the bearings 20 of the standards 14, is a transversely extending shaft 21, and journaled in the bearings 20 of the standards 15 is a transversely extending shaft 22. The shaft 21 as well as the shaft 22 has fixedly secured thereto a pair of spaced sprocket wheels 23.

Interposed between the pairs of standards 14, 15, is a pair of oppositely spaced upright supports 24, each having secured to its inner face a pair of spaced flanged bars 25, 26. Mounted on each tie bar 18 and 19, in proximity to each end thereof and between a pair of standards is an angle-shaped suspending bracket, best shown in Figure 17, and which consists of a pair of arms 27, 28, disposed at an angle with respect to each other. At the point of joinder between the arms 27, 28, the bracket is enlarged, as at 29, and further apertured for the passage of the tie bar 18. The free end of the arm 28 is enlarged, as at 30 and also apertured for the passage of the bar 19. The connecting of the bracket to the bars 18, 19, in the manner as shown, anchors the same. The brackets carried by the tie bars 18 and 19 of the standards 14, have the arms 27 thereof projecting inwardly, and the brackets carried by the bars 18 and 19 of the standards 15, have the arms 27 thereof projecting towards the standards 14. Secured to the arm 27 of each of the brackets, is a vertically extending member 31, having an inwardly extending annular flange 32 at its upper end. The members 31 depend below the arms 27 of the brackets. The members 31 are secured to the outer face of the arms 27 of the brackets. The members 31 secured to the arms 27 of the brackets carried by the standards 14, oppose each other and are connected together by a transversely extending bar 33 which is secured to the flange 32. The members 31, which are supported by the arms 27 of the brackets carried by the standards 15, are arranged in opposed relation and connected together by a transversely extending bar 33 secured to the flange 32, at the upper ends of the members 31.

The brackets carried by the standards 14 and 15, in connection with the members 31 and bars 33, provide track supports for the endless conveyor elements or members of the conveyor mechanism.

Secured to the lower ends of the members 31, is a pair of longitudinally extending spaced lower track members 35, and secured upon the flanges 32 of the members 31, is a pair of longitudinally extending opposed and spaced upper track members 36. The track members 35 and 36, are in the form of channel irons, and the track members 35 are oppositely disposed with respect to the track members 36. The track members 35 project slightly beyond the members 31 but do not extend to the standards 14 and 15. The track members 36 project a greater distance beyond the members 31 than the track members 35, and in close proximity to the sprocket wheels 23. The track members 36 are arranged in alignment with the track members 35.

The sprocket wheels 23, carried by the shaft 21, are arranged in alignment with the sprocket wheels 23 carried by the shaft 22. Travelling over each pair of aligning sprocket wheels is an endless conveyor element or member in the form of a sprocket chain, as indicated at 37, and said chains 37 when the conveyor mechanism is operated, travel through the track members 35 and 36. The track members 36 provide what may be termed supports for the upper portions of the chains 37, during the travel thereof.

Connected to the chains 37, preferably equi-distant, is a series of transversely extending carriers and between each pair of carriers is adapted to be arranged a set of staves, or a predetermined number of staves to provide for setting up the body portion of a collapsible barrel. The staves, however, are only positioned between the carriers on the portions of belts which are travelling through the track members 36, as by the example shown in Figure 3. Each of the carriers, best shown in Figure 19, is formed of a pair of outer and an inner section and with the latter of greater length than either of the outer sections. Each of the outer sections consists of an angle-shaped bar 38, and the inner section of a bar 39 of a length to extend against the lower face of each of the outer sections. The bars 38, as well as the bars 39 are of substantial width, but preferably of less width than the width of a stave. The end terminal portions of the bar 39 are fixedly secured to the inner terminal portions of the bars 38, by hold-fast devices 40. The vertical outer terminal portions of the bars 38 are fixedly secured to the chains 37. The horizontal portions of the bars 38 are arranged above the inner top edges of the track members 36 and provide a clearance for the tools of the combined cutting, bevelling and chamfering mechanisms when such mechanisms are acting upon the staves and so that such tools will not engage the carriers. See Figure 19.

The upright supports 24 extend above the track members 36 and these latter are seated upon the flanged bar 25. The flanged bar 26 extends over the track members 35 and is fixedly secured therewith by hold-fast devices 41.

Positioned against one of the track members 36 and arranged exteriorly thereof, is a longitudinally extending stop member 42, which is angle-shaped in cross section, seated on the flanged bar 25 and also upon the connecting bar 33, which is arranged in proximity to the standards 14. The vertical portion of the stop members 42 projects above that track member 36 with which it is associated and is employed to prevent the staves when they are being positioned upon the chains 37, from passing off the same. The staves are mounted on the chains from one side of the machine, and the member 42 engages the forward ends of the staves when these latter are being positioned on the chains 37 and not only arrest movement of the staves, but provide for the alignment of the said forward ends of the staves. The member 42 is secured against that track member 36 with which it associates, by a bolt 43, which is carried by the member 42 and extends through the upper end of a support 24 and carries on its outer end a wing nut 44, and when the latter is adjusted to abut against the support 24, the member 42 is clamped in position. The member 42 is of a length as to project beyond that support 24 with which it is connected and to extend in close proximity to one of the combined cutting, bevelling and chamfering mechanisms. See Figure 1.

Pivotally connected to the other track member 36, is an angle-shaped confining member 45, which is interposed between the other support 24 and a combined cutting, bevelling and chamfering mechanism. See Figure 1. The confining member 45 is pivotally connected to the other track member 36, as at 46. See Figure 8. The horizontal portion of the member 45 is positioned against the bottom of the track member, and the vertical portion of the confining member 45 is of a height as to project above the top edges of the track member. The confining member 45 is spring controlled, and this provision is had through the medium of a coiled spring 47, which extends transversely with respect to the conveyor mechanism, and has one end fixed, as at 48, to an eye 49, secured to the bottom of the confining member 45, and its other end fixed to an eye 50 carried by the bottom of the stop member 42. The confining member is employed for the purpose of confining the staves on the conveyor mechanism after the staves have been shifted beyond the supports 24, so that the staves cannot shift transversely of the conveyor mechanism and further so that the staves will be in position to be operated upon by the combined cutting, bevelling and chamfering mechanisms.

The intermediate section or bar 39 of each carrier, is provided with a pair of spaced openings 51, and the purpose of such openings will be hereinafter referred to.

The chains 37 of the conveyor mechanism travel in the direction as indicated by the arrow 52, in Figure 3, and as the chains 37 pass upon the tracks 36, the staves 53 are positioned on the chains between a pair of carriers.

*Combined cutting, bevelling and chamfering mechanisms.*—Two of these mechanisms are employed and each is adapted to operate on the end portion of a stave for the purpose of cutting the stave the desired length, as well as acting on the inner face at each end of the stave to not only bevel the same, but also chamfer it to provide a seat to receive the head or bottom of the barrel. As both of these mechanisms are alike in construction, but one will be described, as the description of one will apply to the other. Each of said mechanisms consists of a yoke-shaped body portion 54, arranged to one side of the conveyor mechanism and having the upper end of each of its arms provided with a bearing 55, for a tool operating shaft 56. Fixedly secured to the shaft 56, between the arms of the body portion 54, is a driving pulley 57, for the shaft 56. The pulley 57 is connected by a transmission belt 58 to a suitable operating means. The body portion 54 is disposed in a transverse direction with respect to the conveyor mechanism, and the tool operating shaft 56 extends inwardly from the inner arm of the body portion 54, and has fixed thereto a tool 59 which provides for the cutting off of an end portion of a stave and for the bevelling and chamfering of the inner face of the stave at the end terminal portions thereof. The position of the tool 59 is inwardly with respect to a track member 36. See Figure 4.

The body portion 54 is not only vertically adjustable, but horizontally as well, or in transverse direction with respect to the conveyor mechanism, and to provide for such adjustments, the base of the body portion 54, near one end thereof, has formed integral therewith a rearwardly extending arm 60, which merges into a head piece 61 of a length greater than the width of the arm 60, or in other words, the body portion 54 is provided with a T-shaped extension projecting rearwardly therefrom.

Adjustably mounted on the bar 9, is a slide block 62, having one side thereof grooved, as at 63, for the purpose of straddling the bar 9. The top wall of the groove 63 seats on the top edge of the bar 9, and the bottom wall of the groove 63 engages the bottom edge of the bar 9. The other side of the block 62 is provided with a vertically disposed groove 64, and which extends at right angles with respect to the groove 63. The lower end of the inner wall of the groove 64 has projecting forwardly therefrom, an apertured lug 65. That side of the block 62, which is provided with the groove 64, is formed at each side of the groove with a plurality of openings 66, and that side of the block 62, which is provided with the groove 63, at each side of the latter, is formed with openings 67. Secured to that side of the block 62, which is provided with the openings 64, is a pair of coupling plates 68, each of which partly extends across the groove 64 and acts as a means for retaining the head 61 within the groove 64. See Figures 12 and 13.

The block 62 is connected to the bar 9 by a coupling plate 69, which is arranged against the bar 9, and also against the block 62, and is further secured to the block 62 by bolts 70, which engage in the openings 67. See Figure 13.

The head 61 has depending therefrom, an adjusting screw 71, provided with an adjusting nut 72, which bears against the lug 65. The screw 71 extends down through the aperture of the lug 65. By adjusting the nut 72, the head 61 can be raised or lowered and by loosening the bolts 70, the block 62 can be adjusted lengthwise of the bar 9. This arrangement enables the vertical, as well as the horizontal adjustment of the combined cutting, bevelling and chamfering mechanisms.

Each of the combined cutting, bevelling and chamfering mechanisms is adjusted horizontally, or in a transverse direction with respect to the conveyor mechanism, to provide for cutting off staves of different lengths and to further provide for bevelling and chamfering the inner face, at the end terminal portions of the stave at the proper point. The vertical adjustment of the mechanism is had to provide for different thicknesses of staves, as well as different depths with respect to the bevel or chamfer.

*Staple forming and driving mechanism.—* This mechanism is employed for securing a pair of connecting wires 73, 74, to the outer face of the set of staves through the medium of staples, and is so arranged as to secure each wire to a stave by a plurality of staples, preferably two in number, and with the securing staples for each wire equally spaced with respect to each other. The combined staple forming and driving mechanism is of that type including two pair of staple formers, and a hammer coacting with each former for driving the formed staple into a stave. The mechanism is of that type whereby four staples will be simultaneously formed and simultaneously driven into the stave for connecting the wires 73, 74 therewith. The staples are driven into the staves so that two staples 75 will overlap and secure the wire 73 to a stave, and two staples 76 will overlap and secure the wire 74 to the stave. Any construction of combined staple forming and driving mechanism capable of carrying out the stated operation can be employed in connection with the machine, or a group of combined staple forming and driving mechanisms of the construction disclosed in my co-pending application, Serial Number 678,362, filed December 3, 1923, can be used. The combined staple forming and driving mechanism is referred to generally by the reference character 77, and which is secured to the front of the bar 7, centrally thereof, and is so set up that each pair of formers and their cooperating hammers will be arranged to one side of the vertical center of the bar 7. The operating means for one pair of formers and hammers is indicated at 78, and the operating means for the other pair of formers and hammers at 79. One pair of formers and hammers is arranged in a casing 80, and the other pair of formers and hammers arranged in the casing 81, and the said casings 80, 81 are spaced from each other and connected together by a hanger 82, which is secured to the bar 7. The casings 80, 81, depend from the bar 7, to a point in close proximity to the conveyor mechanism.

The operating mechanism 78 depends from a coupling device 83, which is detachably connected to a reciprocatory cross head 84, and the operating mechanism 79 depends from a coupling device 85, which is also detachably connected to the reciprocatory cross head 84. The cross head 84 extends into the slots 4 of the standards 1, 2, and each end thereof has projecting outwardly therefrom a stub shaft and which are indicated at 86, 87. Mounted on the shaft 86 is an eccentric 88, which is connected by a rod 89 to an eccentric 90, carried by a drive shaft 91, which is journaled in the lower portions of the standards 1, 2, and projects outwardly from each of said standards. Mounted on the shaft 87 is an eccentric 92, which is connected by a rod 93 to an eccentric 94, carried by the shaft 91. The eccentric 90 is arranged on the shaft 91, exteriorly of the standard 2, and the eccentric 94 arranged on the shaft 91 exteriorly of the standard 1.

The coupling device 83, as well as the device 85, has projecting forwardly from the lower portion of the front thereof an apertured lug 95, which constitutes a guide for the connecting wires 96. The lower end of the casing 80, as well as the casing 81 has projecting from the lower portion of the front thereof a pair of spaced lugs 97, having a grooved guide roller 98 for the connecting wires 96. The wires 96 are directed under the lower ends of the casings 80, 81, and centrally with respect to such lower ends.

*Connecting wire feed.—* As two connecting wires are employed, two feeds are provided and each feed consists of the providing of the head bar 5 at each side of its vertical center with a bearing element 99 for a reel shaft 100, which projects forwardly from the bar 5. Mounted on the shafts 100 are reels 101 which carry the connecting wires 96. The reels 101 are spaced from each other and the wires 96 unwind from the inner side thereof and pass down through the guides 95 and over the guide rollers 98, and are projected below the casings 80 and 81. The wires 96 are simultaneously drawn off the reels 101 on the operation of the conveyor mechanism and in a manner to be presently referred to.

*Staple wire feed.—* This feed is provided for the purpose of feeding to the combined forming and driving mechanism four staple wires, and is so set up that two staple wires will be fed to the casing 80, to be acted on by the formers and hammers therein, and two staple wires to the casing 81 to be acted on by the former and hammers therein. The staple wires which are fed to the casing 80 are indicated at 102, 103, and the staple wires fed to the casing 81 are indicated at 104, 105. The wire 102 is drawn off of a reel 106, wire 103 from a reel 107, wire 104 from a reel 108, and wire 105 from a reel 109. The reels 106, 107, 108, 109 are supported above a platform 110, which is secured with and projects rearwardly from the bar 7. Each of the reels is rotatably mounted on a shaft 111. Projecting rearwardly from the casing 80, as well as the casing 81, is a pair of guide tubes for the two wires which are fed to a casing. The tubes which extend rearwardly from the casing 80, are indicated at 112, and the tubes which project rearwardly from the casing 81 are indicated at 113. The tubes are arranged a substantial distance below the platform 110. See Figure 2.

Secured to and depending from the platform 110, near each end thereof is a support 114, provided with a bearing element 115, for a pair of shafts 116, 117, which are arranged rearwardly with respect to the standards 1, 2. The shafts 116, 117, are spaced from each other and said shaft 116 is provided with a pair of double grooved pulleys 118, 119, and each of said pulleys is arranged to one side of and in proximity to the center of the shaft 116, and said pulley 118 is arranged over the tubes 112, and the pulley 119 is arranged over the tubes 113. The shaft 117 is provided with a pair of double grooved pulleys 120, 121 and with the pulley 120 arranged to oppose the pulley 118, and the pulley 121 positioned to oppose the pulley 119. The pulleys 120, 121 are arranged in close proximity to the pulleys 118, 119, and constitute means for drawing the staple wires from off their reels. The wires 102, 103, pass down between the pulleys 118, 120, and the wires 104, 105, pass down between the pulleys 119, 121.

The conducting tubes 112, 113 have upturned rear ends 122 positioned to align with the space formed between the grooved pulleys, so that as the staple wires pass down between the pulleys they are fed into the rear ends of the conducting tubes and directed to the casings 80 and 81 of the combined staple forming and driving mechanism.

The pulleys 118 and 119, are so set up with respect to the pulleys 120, 121, as to provide a gripping action on the staple wires whereby when the pulleys 118, 119 are revolved, the staple wires will be fed into the conducting or guide tubes. The pulleys 118, 119, are fixed to the shaft 116, and said shaft is intermittently revolved through the medium of a ratchet mechanism actuated from the shaft 91.

The ratchet mechanism comprises a ratchet wheel 123, carried by the shaft 116, and which is engaged by a spring controlled pawl 124, carried on the upper end of a ratchet lever 125, which is pivotally mounted on the shaft 127 supported on the standards 1, 2. The lever 125 at its lower end has an angularly disposed arm 126, which is pivotally connected, as at 127', to the upper end of a connecting rod 128, which extends from an eccentric 129 carried by the shaft 91. On the operation of the shaft 91, the eccentric 129, acting on the lever 125 through the medium of the rod 128, will oscillate the lever 125, whereby the pawl 124 will intermittently drive the ratchet wheel 123, under such conditions intermittently revolving the shaft 116 and provide for an intermittent feed of the staple wires simultaneously to the combined staple forming and driving mechanism.

*Operating means for the conveyor mechanism.*—This operating means is designed for the purpose of intermittently driving the conveyor mechanism, and it comprises a ratchet wheel 130, which is fixed to the outer end of the shaft 22. Mounted for oscillation on the outer end of the shaft 22, exteriorly of the ratchet wheel 130, is a lever arm 131 provided with a pawl 132, which during the oscillation of the arm 131 engages with the ratchet wheel 130 and intermittently revolves the same. Connected to the upper end of the arm 131 and projecting forwardly therefrom, is an angle-shaped bar 133, best shown in Figure 10, and which has its forward end pivotally connected, as at 134, to the upper end of the arm 135 of a bell crank lever 136, which is mounted on the shaft 127. The other arm of the bell crank lever 136 is indicated at 137, and is pivotally connected, as at 138, to a rod 139, which extends from an eccentric 140, carried by the shaft 91. When the eccentric 140 is driven from the shaft 91, the bell crank lever 136 will be oscillated through the medium of its connection with the eccentric 140, and on the oscillation of the lever 136, the angle-shaped bar 133 will be reciprocated thereby oscillating the lever arm 131, and providing for the intermittent revolving of the ratchet wheel 130, due to the intermittent driving engagement of the pawl 132 with said ratchet wheel, and when the latter is intermittently driven, the conveyor mechanism will be intermittently operated, causing the same to travel in the direction as indicated by the arrow 52 in Figure 3.

*Operating means for the shaft 91.*—Mounted on the shaft 91, in proximity to one end thereof, is a gear wheel 141, which is adapted to be meshed with a pinion 142, carried by a drive shaft 143, connected by a suitable transmission, as at 144, with an operating means, not shown, therefor. The clutch mechanism for shifting the gear 141 into operative connection with the pinion 142 may be of any suitable form, and is conventionally illustrated at 145. The shaft 91 carries a disk 146, with which associates a brake mechanism 147 of the band type. The lever for operating the clutch mechanism is indicated at 148, and the lever for operating the brake mechanism is indicated at 149. A supporting bar 150 is provided for the levers 148 and 149.

*Stave supports.*—These supports are employed for supporting the staves when the connecting wires are being stapled therewith, and said supports are three in number and consist of an intermediate support 151 and a pair of outer supports 152, 153. The support 151 cooperates with the combined staple forming and driving mechanism for the purpose of clenching the staples when driven through the staves. The support 151, is fixed to the forward face of the bar 11, by hold-fast devices 154, and has its upper end provided with a rectangular head piece 155 of substantial length and width. The support 152, as well as the support 153, is secured to the bar 11, by hold-fast devices 156, and the support 152, as well as the support 153 is positioned a substantial distance from the support 151. The support 152, as well as the support 153 is provided with a rectangular head piece 157 of substantial length and width. The operative relation of the supports 151, 152 and 153, with respect to a stave, is best shown in Figure 5. The supports 152, 153 are positioned inwardly with respect to the chains 37 of the conveyor mechanism.

*Holding-down elements for the staves.*—Two of these elements are employed and each is of a construction as shown in Figure 15. The stave holding-down elements cooperate with the supports 152, 153. One of these elements is spaced a substantial distance from the casing 80, and the other from the casing 81, and each of said elements consists of a head piece 158, which is secured to the forward face of the bar 7. Formed integral with the bottom of the head piece 158 is a forwardly extending inclined arm 159 which terminates at its lower end in a forwardly extending flat holder 160 of substantial length, which is disposed to overlie the staves transversely thereof. The forward end of the holder 160 is up-turned in a curvilinear manner, as at 161. Extending from the head piece 158 to the forward end of the holder 160, and formed integral with the latter and the arm 159 on the upper face thereof, is a reinforcing rib 162, and formed integral with the rib 162 and with the head piece 158 is a brace member 163.

*Lower combined stave support and guide element.*—This element is best shown in Figures 3 and 7, and acts as means for guiding and supporting the staves, as they are conveyed towards the combined cutting, beveling and chamfering mechanisms, as well as toward the combined staple forming and driving mechanism, and furthermore it acts to support the staves after the end portions have been cut therefrom to form the staves of a length less than the distance between the chains 37 of the conveyor mechanism. The said element is disposed at the longitudinal center of the machine and comprises a bar 164 of substantial length and which has its forward end bevelled, as at 165. Depending from the rear of the bar 164, is a combined support and coupling means therefor, and which consists of a vertical arm 166 and an inclined arm 167. The arm 166 is integral with the bar 164 at the forward end thereof, and the arm 167 is formed integral with the bar 164 a substantial distance forwardly with respect to the rear end of the bar. The arms 166 and 167 terminate in an abutment 168, which is formed integral with the lower ends of said arms, and depending from the abutment 168 is a pair of spaced apertured coupling arms 169, 170.

The combined stave support and guide element is mounted on the bar 9, centrally thereof, and with the abutment 168 positioned on the top edge of the bar 9. The arms 169 and 170 depend below the bar 9 and are connected together by a bolt 171, which bears against the lower edge of the bar 9 and secures said element in position. The bar 164 is of a length to extend forwardly with respect to the standards 24. See Figure 3.

*Upper stave guide and holder element.*—This element is best shown in Figure 16, and has a portion thereof arranged in superposed relation with respect to the bar 164 of the combined support and stave guide element. The combined upper guide and stave holder element is arranged over the staves and in the position as shown in Figure 3, and includes a combined guide and holding bar 172 of greater length than the bar 164, and of such length whereby the bar 172 will project rearwardly from the bar 164 and over the support 151. See Figure 3.

The bar 172 has each of its ends bevelled, as at 173, and said bar 172 is supported from the bar 7 through the medium of a hanger consisting of a head piece 174, an angularly disposed arm 175, which is integral with the head piece 174, projects forwardly from the latter and is seated upon and secured to the bar 172 by the hold-fast devices 176. Formed integral with the arm 175 and head piece 174, is a brace member 177. The head piece 174 is secured to the bar 7, between the casings 80 and 81. See Figure 4.

The bar 172 of the combined support and stave guide holder element is adjustably positioned relative to the staves, or in other words, has means associating therewith for maintaining the forward end of such bar in the desired position with respect to the staves, or a means to prevent the forward end of the bar 172 from springing upwardly, and the said means may be termed an adjustable holding device, and it comprises a pair of supporting members 178 and 179. The member 178 is secured to the outer side of one of the track members 36, as at 180, and projects laterally therefrom. The member 178 is yoke-shaped. The member 179 is angle-shaped in contour and has the vertical leg thereof secured to the outer side of the retaining member 42, as at 181. The horizontal leg of the member 179 projects laterally from the retaining or stop member 42. The members 178, 179 provide a support for a transverse bar 182, which is detachably connected to one of the legs of the member 178 by a bolt 183 and a thumb nut 184, and is also detachably connected to the horizontal leg of the member 179 by a bolt 185 and wing nut 186. The bar 182 extends transversely of the top of the carrier mechanism, as well as being suitably spaced therefrom, and said bar 182, at a point over the bar 172, carries an adjustable holding-down screw 187 which engages with the bar 172 for holding it in the desired position with respect to the bar 164.

The bars 164 and 172 prevent the buckling of the staves at the center thereof when they are being fed rearwardly with respect to the conveyor mechanism and further maintain the staves in alignment with each other.

It is thought that the operation of the several devices or mechanisms, can be readily understood from the foregoing description taken in connection with the accompanying drawings, as well as the function of the several devices and mechanisms, but it will be stated that prior to throwing of the machine into operation, the pair of connecting wires 96 is manually secured to that carrier of the conveyor mechanism which is in close proximity to the combined forming and driving mechanism, preferably the conveyor mechanism is shifted or operated sufficiently to position a carrier directly below the combined staple forming and driving mechanism and after the carrier has reached such position the connecting wires 96 are secured with such carrier by passing said wires through openings 51 in the carrier and connecting the wires thereto. The number of staves is then mounted on the conveyor mechanism between a pair of carriers and the machine thrown into operation, and the staves between the pairs of carriers are fed towards the combined cutting, bevelling and chamfering mechanisms.

As the sets of staves are moved rearwardly by the conveyor mechanism, they pass between the bars 164 and 172, due to the action of a carrier. As the staves are moved rearwardly by the conveyor mechanism, they are first acted upon by the combined cutting, bevelling and chamfering mechanisms which cut the staves to the desired length, as well as chamfer and bevel the inner faces of the staves at the inner end terminal portions thereof. After the staves have been cut to the desired length, they are of less length than the length between the chains 37 of the conveyor mechanism, and of a length as shown in Figure 18. At this point they are supported by a bar 164 and moved onto the supports 151, 152 and 153. When a stave reaches the supports 151, 152 and 153, it is held down thereon through the medium of the holders 162 and bar 172. When a stave is shifted to a position under the staple forming and driving mechanism, it has attached thereto the pair of wires 73 and 74 and with the wire 73 secured to the staves by a pair of staples 75, and the wires 74 by a pair of staples 76.

The staples are set up equi-distant from each other, and the width of the carrier is such as to provide for the necessary length of wire between the outer staves of a set so that when that portion of wire which extends over a carrier is severed, the wires 73, as well as the wires 74 will have the free-end terminal portions of a length so that they can be twisted, or otherwise secured together to hold the barrel body in closed position.

As the staves pass rearwardly from the combined staple forming and driving mechanism, they ride upon a support 188, arranged rearwardly of said mechanism and between the tracks 36.

The operation of the several mechanisms or devices, is intermittent and so timed as to provide for the successively securing to each stave of a set of connecting wires by a pair of staples. The connected set of staves may be severed from an adjacent set when completed, but if desired the connected sets can be removed from the machine when finished and afterwards severed.

It is thought that the many advantages of quickly connecting the necessary number of staves to provide a collapsible barrel body provided with reinforcing wires which also act as connecting means for the staves, can be readily understood from the foregoing description taken in connection with the accompanying drawings, and it will furthermore be stated that although the preferred embodiment of the machine is as described and illustrated, yet changes in the details of construction can be had which will fall within the light of the invention as claimed.

What I claim is:—

1. In a barrel stave assembling and forming machine, a mechanism for positioning, feeding and attaching flexible connecting elements to staves in sets for the subsequent formation of collapsible barrels, means for shortening the length of and for bevelling and chamfering the terminal portions of the inner faces of the staves prior to the connecting together of the staves in sets, and a conveyor mechanism common to said means and the first mentioned mechanism for feeding the staves in sets thereto.

2. A machine for the purpose set forth comprising a stave conveyor mechanism including carriers for conveying and separating barrel staves in sets and with each set constituting the required number of staves to provide a collapsible barrel body, a pair of combined stave cutting, bevelling and chamfering devices acting upon the end terminal portions of the conveyed staves, means for successively securing to the conveyed staves after being acted upon by said devices a pair of combined flexible connecting and reinforcing elements to provide the collapsible barrel body, and operating means for said devices, mechanism and means.

3. In a barrel stave assembling and forming machine, a conveyor mechanism comprising a pair of upper track members, a pair of lower track members arranged in alignment with the upper track members, intermittently shiftable endless flexible members travelling on said track members, spaced transversely extending carriers connecting said flexible members together and each having an inset intermediate portion providing a conveying and spacing medium for sets of barrel staves, a longitudinally extending combined stave retaining and stop member secured to one of the upper track members, a longitudinally extending spring controlled stave confining member connected to the other of the track members, and means for intermittently operating said endless members.

4. A machine for the purpose set forth comprising a stave conveyor mechanism for conveying and arranging staves in sets, a pair of combined stave cutting, bevelling and chamfering devices operating synchronously and arranged to simultaneously operate successively on the staves of a set during the conveying thereof by said mechanism, mechanism for successively securing to the staves of a set after being acted upon by said devices a pair of flexible combined connecting and reinforcing elements to provide a collapsible barrel body, means for intermittently operating said conveyor mechanism, operating means for said devices, and operating means for said flexible element securing mechanism.

5. A machine for the purpose set forth comprising a stave conveyor mechanism, means for successively securing to each of the conveyed staves a pair of combined flexible connecting and reinforcing elements, a combined guide and supporting element extending longitudinally of said conveyor element centrally thereof and arranged below the conveyed staves, a combined stave guide and holding element arranged in superposed relation and spaced from said supporting element and positioned above the conveyed staves, stave supporting elements projecting forwardly from and arranged in cooperative relation with respect to said means and further positioned below the staves, stave holding elements projecting forwardly from said means and arranged in superposed relation with respect to certain of the elements of said series of supporting elements and further positioned above the staves, a holding-down element for said combined stave guide and holding element, and operating means for said mechanism and the means for securing the flexible elements to the staves.

In testimony whereof, I affix my signature hereto.

ROBERT J. McCLENNY.